Nov. 7, 1933.  I. H. JUDD  1,934,129
VEHICLE CHASSIS STRUCTURE
Filed Dec. 5, 1932   2 Sheets-Sheet 1
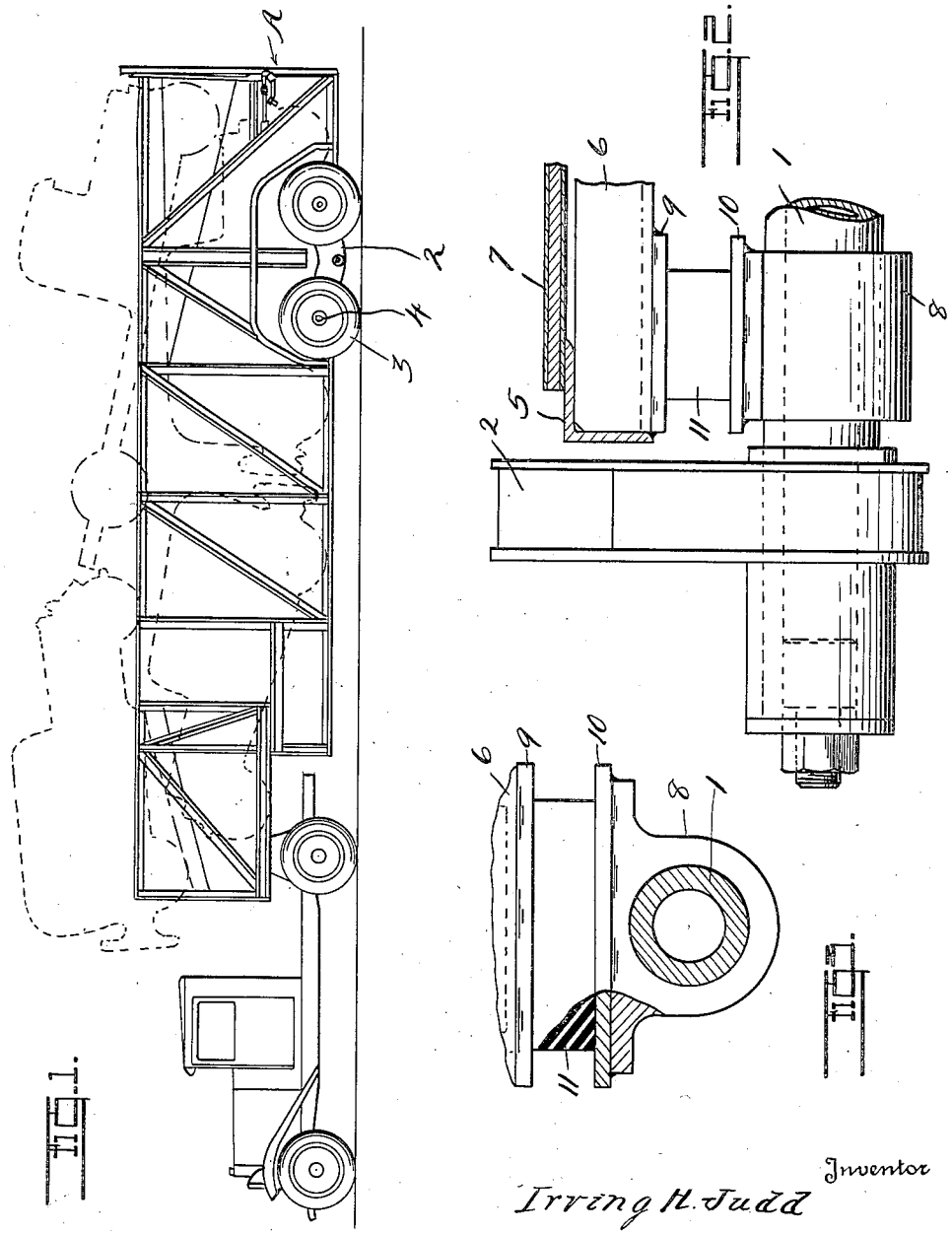
Inventor
Irving H. Judd Nov. 7, 1933.    I. H. JUDD    1,934,129
VEHICLE CHASSIS STRUCTURE
Filed Dec. 5, 1932    2 Sheets-Sheet 2
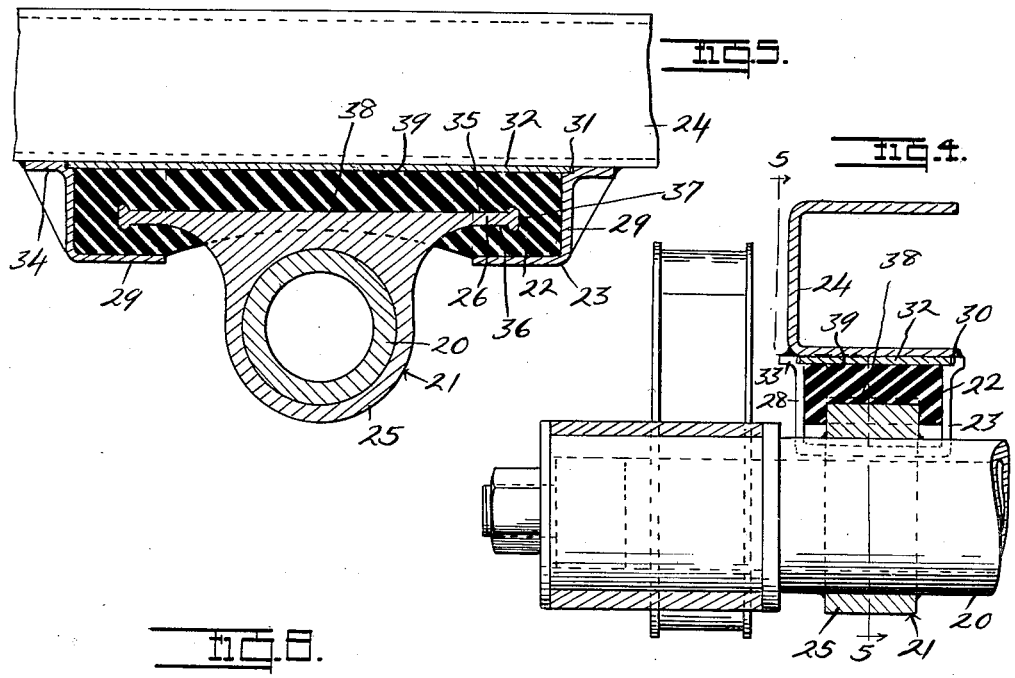
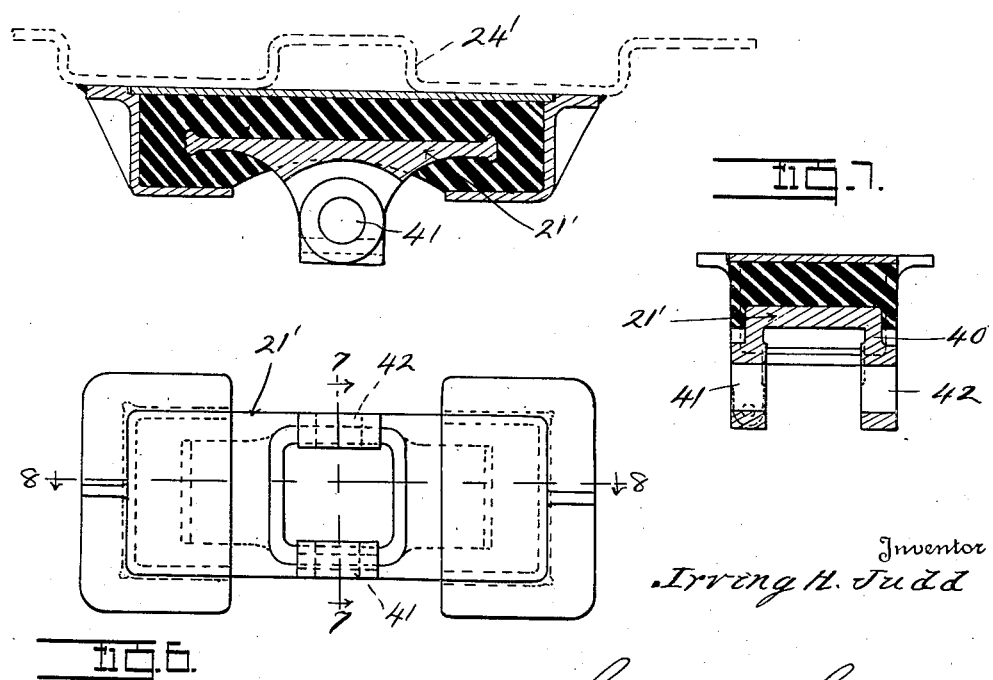
Inventor
Irving H. Judd Patented Nov. 7, 1933

1,934,129

UNITED STATES PATENT OFFICE 1,934,129

VEHICLE CHASSIS STRUCTURE

Irving H. Judd, Detroit, Mich., assignor to Whitehead & Kales Company, River Rouge, Mich., a corporation of Michigan Application December 5, 1932. Serial No. 645,850

2 Claims. (Cl. 280—124)

This invention relates generally to vehicle chassis structures and consists of certain novel features of construction, combinations and arrangements of parts that will be hereinafter more fully described and particularly pointed out in the appended claims.

One of the essential objects of the invention is to provide a vehicle chassis wherein cushioning means for the chassis frame is connected to and constitutes suspension means for an axle of a tandem wheel assembly.

Another object is to provide a vehicle chassis wherein the chassis frame is supported between the walking beams of the tandem wheel assembly and at the same time is effectively cushioned against road shocks.

Another object is to provide a vehicle chassis wherein a pair of blocks of rubber constitute the suspension and cushioning means aforesaid and may be manufactured and assembled at a relatively low cost.

Other objects, advantages and novel details of construction of this invention will be made more apparent as this description proceeds, especially when considered in connection with the accompanying drawings.

In the accompanying drawings:

Figure 1 is a side elevation of a vehicle having a vehicle chassis embodying my invention;

Figure 2 is an enlarged fragmentary sectional view through the vehicle chassis;

Figure 3 is a view taken at substantially right angles to Figure 2 and showing parts broken away and in section;

Figure 4 is a fragmentary vertical sectional view through a slightly modified construction;

Figure 5 is a sectional view taken on the line 5—5 of Figure 4;

Figure 6 is a bottom plan view of another modification;

Figure 7 is a sectional view taken on the line 7—7 of Figure 6;

Figure 8 is a sectional view taken on the line 8—8 of Figure 6.

Referring now to the drawings, A is a suitable vehicle chassis wherein 1 is an axle; 2 are walking beams pivotally mounted upon the axle at opposite ends thereof and preferably corresponding to those set forth in my application, Serial No. 603,191, filed April 4, 1932; and 3 are ground engaging wheels arranged in tandem and rotatably mounted on spindles 4 projecting laterally from the outer sides of said beams at opposite ends thereof. 5 are sills above the axle between the beams 2; 6 are crossbars extending between and terminally secured to said sills, and 7 is a flooring upon and secured to said sills and crossbars.

8 are metal blocks sleeved upon the axle beneath one of the crossbars 6 adjacent the walking beams 2; 9 and 10 respectively are substantially flat plates of steel welded to the opposed faces of said blocks 8 and crossbar 6, and 11 are blocks of rubber or rubber composition between and vulcanized to the opposed faces of said plates 9 and 10.

The foregoing construction corresponds to the structure illustrated in Figures 8 and 9 of my application, Serial No. 604,579, filed April 11, 1932. In use, the blocks 11 will cushion the chassis frame formed by the sills 5 and crossbars 6 and will absorb the shocks. As shown, the blocks 8 and 11 and frame are arranged in superposed relation between and substantially in the horizontal plane of the walking beams 2, hence the over-all height of the vehicle is less, the center of gravity is lower, and loading and unloading may be accomplished with greater ease. Moreover, the assembly comprises a minimum of parts and may be economically manufactured.

In Figures 4 and 5, I have illustrated a slight modification wherein the axle 20 is carried by brackets 21 anchored in blocks 22 of resilient material that in turn are held by casings 23 welded or otherwise fixed to the frame members 24 of the chassis. As shown, the brackets 21 have circular portions 25 that receive and are welded to the axle 20 and have wing portions 26 that are embedded in the blocks 22 of resilient material. The casings 23 are arranged in pairs and receive opposite ends of the blocks 22. Preferably each casing is a casting and has flat bottom, side and end walls 27, 28 and 29 respectively. The bottom walls 27 constitute seats for the end portions of the blocks 22 and underlie the wing portions 26 of the brackets while the side and end walls 28 and 29, respectively, are provided at their upper edges with connecting recesses 30 and 31, respectively, to receive the edges of a suitable cover plate 32 and have connecting laterally extending flanges 33 and 34, respectively, that bear against and are welded to the lower faces of the frame members 24. The cover plate 32 is preferably flat and also bears against the lower faces of the frame members 24. Thus the plates 32 cooperate with the casings 23 to house the rubber blocks 22. Preferably such blocks 22 are vulcanized to the upper and lower faces and ends 35, 36 and 37, respectively, of the wing portions, to the upper faces 38 of the brackets, to the lower face 39 of the cover plate 32 and to the bottom, end and side walls 27, 28 and 29, respectively, of the casings so that a sturdy unitary structure is provided. Thus the rubber blocks 22 are vulcanized to all parts with which they contact. Moreover, the construction and arrangement of castings 23, blocks 22 and brackets 21 are such that the brackets 21 will always be retained by the casings 23 even though the rubber blocks 22 should deteriorate or otherwise become unfit or inoperative. Consequently there is no danger of the axle 20 ever becoming entirely separated from or leaving the chassis frame.

In Figures 6 to 8, inclusive, I have illustrated another modification wherein the vehicle frame member 24' is constructed as illustrated by dotted lines in Figure 8, and each bracket 21' is provided with an inverted U-shaped portion 40 having aligned openings 41 and 42, respectively, for receiving the axle such as 20. Otherwise the construction is the same as that illustrated in Figures 4 and 5.

What I claim as my invention is:

1. In a vehicle chassis, a frame, a transversely extending axle beneath said frame, and suspension means for said axle including a metal block sleeved upon said axle, plate-like members disposed flat against and secured to said frame and block, and a block of resilient material between and vulcanized to the opposed faces of said plate-like members.

2. In a vehicle chassis, a frame, a transversely extending axle beneath said frame, and suspension means for the axle including a plate secured to the underside of the frame, a block of rubber secured to the underside of said plate, and a block of metal sleeved upon said axle and secured directly to the block of rubber.

IRVING H. JUDD.